(12) United States Patent
Callanan et al.

(10) Patent No.: US 9,715,544 B2
(45) Date of Patent: Jul. 25, 2017

(54) ONLINE LOCATION SHARING THROUGH AN INTERNET SERVICE SEARCH ENGINE

(75) Inventors: Sean Callanan, Dublin (IE); Ruthie D. Lyle, Durham, NC (US); Patrick Joseph O'Sullivan, Ballsbridge (IE); Fred Raguillat, Dunboyne (IE); Carol Sue Zimmet, Boxborough, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1046 days.

(21) Appl. No.: 12/857,705

(22) Filed: Aug. 17, 2010

(65) Prior Publication Data

US 2012/0047207 A1 Feb. 23, 2012

(51) Int. Cl.
*G06F 15/16* (2006.01)
*G06F 17/30* (2006.01)
*G06F 21/62* (2013.01)

(52) U.S. Cl.
CPC .... *G06F 17/30864* (2013.01); *G06F 21/6227* (2013.01)

(58) Field of Classification Search
CPC ............................... H04L 51/36; H04L 51/00
USPC ........................................................ 709/204
See application file for complete search history.

(56) References Cited

U.S. PATENT DOCUMENTS

| | | | |
|---|---|---|---|
| 7,080,139 B1 * | 7/2006 | Briggs et al. | 709/224 |
| 8,132,110 B1 * | 3/2012 | Appelman et al. | 715/752 |
| 2006/0223518 A1 * | 10/2006 | Haney | 455/420 |
| 2007/0286181 A1 * | 12/2007 | Bushmitch et al. | 370/356 |
| 2008/0005072 A1 * | 1/2008 | Meek et al. | 707/3 |
| 2008/0140840 A1 * | 6/2008 | Hamilton et al. | 709/226 |
| 2008/0172458 A1 | 7/2008 | Middleton et al. | |
| 2008/0182563 A1 | 7/2008 | Wugofski et al. | |
| 2009/0070412 A1 | 3/2009 | D'Angelo et al. | |
| 2009/0249451 A1 | 10/2009 | Su et al. | |
| 2011/0055264 A1 | 3/2011 | Sundelin et al. | |

(Continued)

FOREIGN PATENT DOCUMENTS

WO 2010025343 3/2010

OTHER PUBLICATIONS

Danninger et al, "The Connector Service-Predicting Availabiity in Mobile Contexts", LNCS 4299, pp. 129-141, 2006.*

(Continued)

*Primary Examiner* — Hua Fan
(74) *Attorney, Agent, or Firm* — Steven L. Nichols; Fabian VanCott (57) ABSTRACT

A system for online location sharing through an internet service search engine includes: a server comprising at least one processor and a memory communicatively coupled to the processor. The memory stores instructions that, when executed by the at least one processor, cause the at least one processor to: receive from a first user a query identifying a second user; query a plurality of internet services over a network for real-time information relevant to the second user; and
provide a consolidated view of responses received from the plurality of internet services to the first user. Thee server is authorized by the second user to receive all information relevant to the second user contained in the responses. The consolidated view of responses indicates an online location of the second user.

21 Claims, 7 Drawing Sheets

(56) References Cited

U.S. PATENT DOCUMENTS

2011/0238840 A1    9/2011  Shi et al.

OTHER PUBLICATIONS

"Swimwire.com—Bringing Social Networks Together", killerstartups.com.
"AmpliFeeder.com—An Open Source Lifestream Platform", killerstartups.com.
Bottazi et al.; "Context-Aware Middleware Solutions for Anytime and Anywhere Emergency Assistance to Elderly People"; Apr. 2006; IEEE Communications Magazine, all pages.

* cited by examiner

Fig. 7

ONLINE LOCATION SHARING THROUGH AN INTERNET SERVICE SEARCH ENGINE

BACKGROUND

Aspects of the present specification relate to ascertaining an online location of a person. More particularly, the present specification relates to locating a person online using an internet service search engine.

An internet service is an application that provides its functionality to a user over the internet, often through a web page. Examples of internet services include, for example, web-based social networking services, web-based collaboration software, web-based email accounts, and the like. Such internet services provide the advantage of portability in that a user may access an internet service from nearly any location with a connection to the internet.

With the increasing popularity of online collaboration and social networking, the number of internet services available to users has grown. In fact, it is very common for one person to maintain a separate account with many different internet services. While the use of multiple internet services increases the avenues by which a user can communicate with other people, it can be difficult to ascertain which internet service would be best for contacting a user or receiving the most recent information posted by the user at any given time.

BRIEF SUMMARY

A method of online location sharing through an internet service search engine includes: receiving in a server a query from a first user that identifies a second user; querying multiple internet services with the server over a network for real-time information regarding the second user; and providing a consolidated view of responses received from the internet services to the first user with the server the server being authorized by said second user to receive all information relevant to said second user contained in said responses; wherein the consolidated view of responses indicates an online location of the second user.

A method of online location sharing through an internet service search engine includes: receiving in a server from a first user a query identifying a second user; querying each of a plurality of individual internet services using a standardized application programming interface (API) call to request real-time information stored by the individual internet services that is relevant to the second user; receiving in the server a plurality of responses from the individual internet services, the server being authorized by the second user to receive all information relevant to the second user contained in the responses; determining an online location of the second user with the server from the received responses; and providing the online location of the second user to the first user with the server.

A system for online location sharing through an internet service search engine includes a server having at least one processor and a memory communicatively coupled to the processor. The memory includes stored instructions that, when executed by the at least one processor, cause the at least one processor to: receive from a first user a query identifying a second user; query multiple internet services over a network for real-time information relevant to the second user; and provide a consolidated view of responses received from the internet services to the first user, the server being authorized by the second user to receive all information relevant to the second user contained in the responses; wherein the consolidated view of responses indicates an online location of the second user.

A computer program product for online location sharing through an internet service search engine includes a computer readable storage medium having computer readable program code embodied therewith. The computer readable program code includes: computer readable program code configured to receive from a first user a query identifying a second user; computer readable program code configured to query multiple internet services over a network for real-time information relevant to the second user; and computer readable program code configured to provide a consolidated view of responses received from the internet services to the first user, the first user being authorized by the second user to receive all information relevant to the second user contained in the responses; wherein the consolidated view of responses indicates an online location of the second user.

BRIEF DESCRIPTION OF THE SEVERAL VIEWS OF THE DRAWINGS

The accompanying drawings illustrate various embodiments of the principles described herein and are a part of the specification. The illustrated embodiments are merely examples and do not limit the scope of the claims.

Throughout the drawings, identical reference numbers designate similar, but not necessarily identical, elements.

DETAILED DESCRIPTION

The present specification discloses methods, systems, and computer program products directed to the location of a person using an internet service search engine which queries multiple internet services concurrently in real-time for information about the searched person. The internet service search engine synthesizes responses received from the internet service applications into a current online location of the searched person. In this way, a searching party may quickly and easily determine the best internet service through which the searched person may be contacted and/or view the most recent information posted by the searched person.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

As used in the present specification and in the appended claims, the term "online location" refers to a specific network-based service with which a person is currently interacting or has most recently interacted.

As used in the present specification and in the appended claims, the term "internet service" refers to an application that provides its functionality to a user over the internet, such as through a web page. Examples of such "internet services" include, but are not limited to, social networking services, online collaboration services, web-based email services, and the like.

Figure 1:
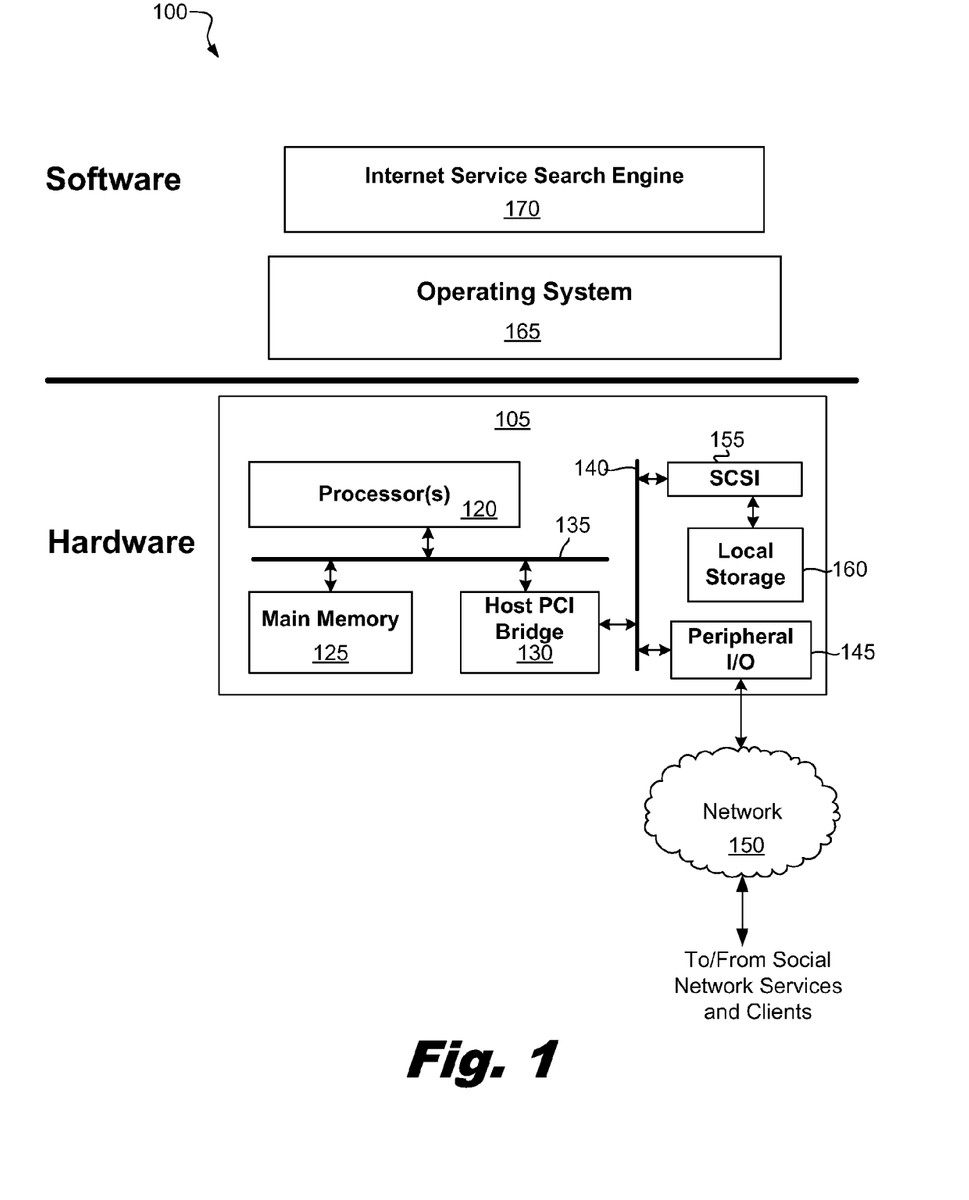
FIG. 1 is a block diagram of an illustrative computing device configured to implement an internet service search engine, according to one exemplary embodiment of principles described herein.

With reference now to FIG. 1, an illustrative computing device (100) is shown that may be used to implement an internet service search engine (170) according to the principles described herein The hardware platform (105) of the computing device (100) may include at least one processor (120) that executes code stored in the main memory (125). In certain embodiments, the processor (120) may be a multi-core processor having multiple independent central processing units (CPUs), with each CPU having its own L1 cache and all CPUs sharing a common bus interface and L2 cache. Alternatively, the processor (120) may be a single-core processor.

The at least one processor (120) may be communicatively coupled to the main memory (125) of the hardware platform and a host peripheral control interface (PCI) bridge (130) through a main bus (135). The main memory (125) may include dynamic non-volatile memory, such as random access memory (RAM). The main memory (125) may store executable code and data that is obtainable by the processor (120) through the main bus (135).

The host PCI bridge (130) may act as an interface between the main bus (135) and a peripheral bus (140) used to communicate with peripheral I/O devices (145). Among these peripheral devices may be a network interface configured to communicate with an external network (150), external human interface devices (e.g., monitor, keyboard, mouse, touch screen, speaker, microphone), other external devices (e.g., external storage, dongles, specialized tools), serial buses (e.g., Universal Serial Bus (USB)), and the like. A Small Computer System Interface (SCSI) (155) for communicating with local storage devices (160) may also communicate with the peripheral bus (140).

It will be readily apparent to those having skill in the art that the present configuration of the hardware platform (105) is merely illustrative of one type of hardware platform (105) that may be used in connection with the principles described in the present specification. Moreover, it will be further apparent that various modifications, additions, and deletions to the hardware platform (105) shown are conceivable and anticipated by the present specification.

The hardware platform (105) shown in the lower half of the diagram of FIG. 1 is configured to implement the elements of software functionality shown in the upper half of the diagram of FIG. 1. Thus, as shown in FIG. 1, an operating system (165) program is executed directly by the hardware platform (105). The operating system (165) may interact with and manage the performance of hardware resources in the hardware platform (105), including the processor(s) (120), the main memory (125), and the peripheral devices. As such, the operating system (165) controls the execution of computer programs by the processor(s) (120). Among these computer programs may be an internet service search engine (170). As will be described in more detail below, the internet service search engine (170) may perform the functionality of receiving a query identifying a user, interrogating a plurality of internet services for information regarding the identified user, and synthesizing an online location for the identified user from the responses of the interrogated internet services.

Figure 2:
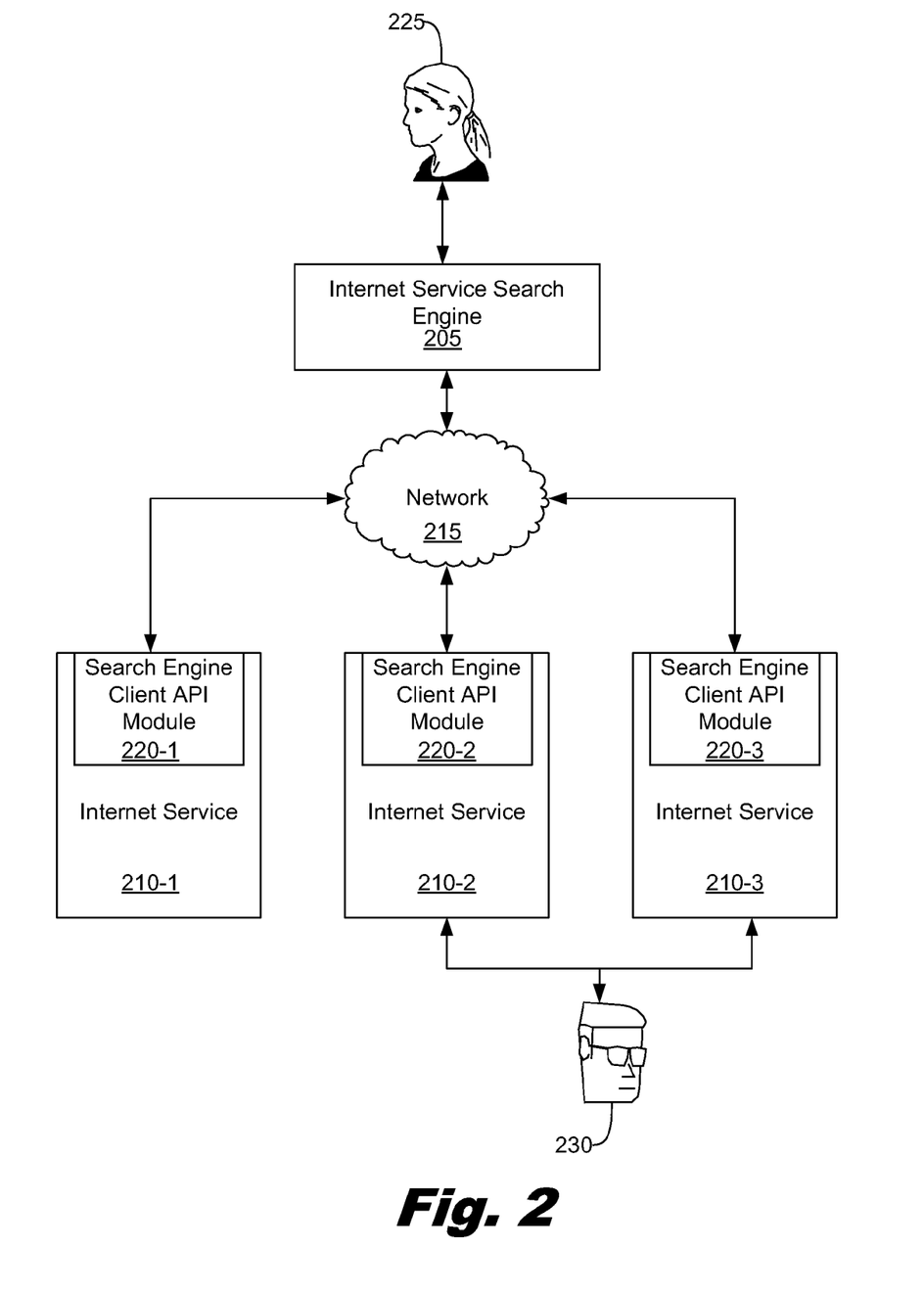
FIG. 2 is a diagram of an illustrative internet service search engine communicatively coupled to a plurality of internet services over a network, according to one exemplary embodiment of principles described herein.

FIG. 2 shows a block diagram of an illustrative internet service search engine (205) communicatively coupled to a plurality of internet services (210-1 to 210-3) over a computer network (215), according to one exemplary embodiment of principles described herein. Each of the internet services (210-1 to 210-3) may implement a search engine client module (220-1 to 220-3, respectively) affiliated with the internet service search engine (205).

The internet service search engine (205) may be implemented by one or more servers according to the model shown in FIG. 1. The internet service search engine (205) is configured to interact with a first user (225), either directly or over a network. For example, the first user (225) may be physically present at the same site as a server implementing the internet service search engine (205) and interact with the server through peripheral human interface devices associated with the server. Alternatively, the first user (225) may use a client device to communicate with the internet service search engine over a network, such as a local area network (LAN), a Wide Area Network (WAN) (e.g., the Internet), or the like. Examples of suitable client devices that may be used by the first user (225) to interact with the internet service search engine (225) include, but are not limited to, personal computers, mobile telephones, personal digital assistants (PDAs), servers, and the like.

In certain embodiments, the internet service search engine (205) may be an extension of an existing internet search engine. In other embodiments, the internet service search engine (205) may be a standalone search engine available over the internet or an autonomous computer application executed individually on a personal computer.

The internet service search engine (205) is communicatively coupled to the internet services (210-1 to 210-3) over a network (215). This network (215) may a LAN or a WAN such as the Internet. The network (215) may be the same as the network through which the first user (225) interacts with the internet service search engine (205). Alternatively, these two networks may be separate. A second user (230) interacts with at least some of the internet services (210-1 to 210-3). In certain embodiments, this interaction may occur through a network, which may be the same as network 215, the network through which the first user (225) interacts with the internet service search engine (205), or a different network altogether.

The internet services (210-1, to 210-3) may be server implemented social network services through which members of the internet services may disseminate information to their friends and contacts within their social networks. The internet services (210-1 to 210-3) provide the storage and communication infrastructure through which such information dissemination is possible.

As alluded to above, each of the internet services (210-1 to 210-3) of the present example implements a respective search engine client API module (220-1 to 220-3) affiliated with the internet service search engine (205). The search engine client API modules (220-1 to 220-3) may be software plugins developed specifically for their respective internet services (210-1 to 210-3) to cause the internet services (210-1 to 210-3) to implement a standardized API for the internet service search engine, thereby providing a way for the internet service search engine (205) to efficiently and effectively interrogate each of the internet services (210-1 to 210-3) in real time for information regarding a specific user, such as the second user (230). For example, each search engine client API module (220-1 to 220-3) may be developed to allow the internet service search engine (205) to query each internet service (210-1 to 210-3) using a standardized API call. In certain examples, one or more of the search engine client API modules (220-1 to 220-3) may be implemented by a dedicated server within the hardware architecture of the affiliated internet service (210-1 to 210-3). Alternatively, the search engine client API modules may be software plugins or patches executed by the internet services (210-1 to 210-3).

Figure 3:
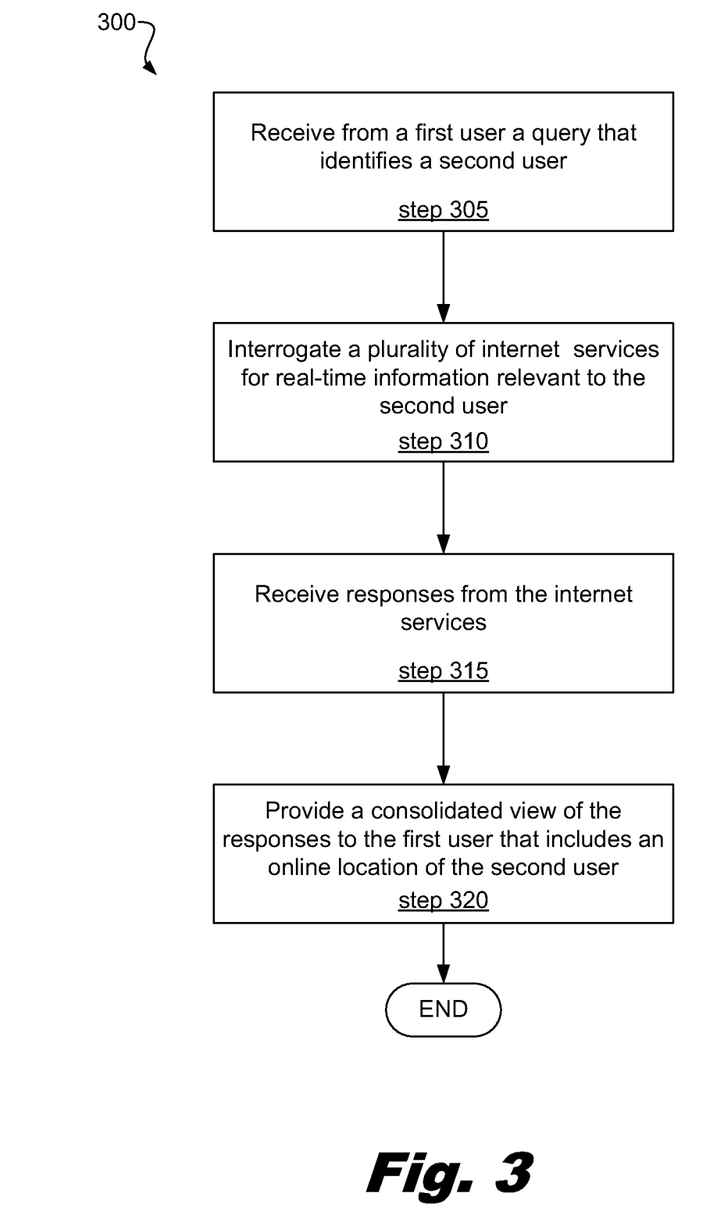
FIG. 3 is a flowchart diagram of an illustrative method of locating a person using an internet service search engine, according to one exemplary embodiment of principles described herein.

Referring now to FIG. 3, a block diagram of an illustrative method (300) of locating a person using an internet service search engine (205, FIG. 2), such as that shown in FIG. 2. In this method (300), the internet service search engine (205, FIG. 2) receives (step 305) a query that identifies the second user (230, FIG. 2). The internet service search engine (205, FIG. 2) then interrogates (step 310) multiple internet services (210-1 to 210-3) for real-time information about the second user (230, FIG. 2). The information sought may be data recently uploaded by the second user (230, FIG. 2) to the internet services (210-1 to 210-3, FIG. 2), particularly where a current online location and/or an activity of the second user (230, FIG. 2) can be determined from the data. Interrogating (step 310) the internet services (210-1 to 210-3, FIG. 2) may involve establishing communication between the internet service search engine (205, FIG. 2) and the individual search engine client API modules (220-1 to 220-3, FIG. 2) installed in each of the internet services (210-1 to 210-3, FIG. 2) and requesting information about the second user (230, FIG. 2) from the internet services (210-1 to 210-3, FIG. 2) through the individual search engine client API modules (220-1 to 220-3, FIG. 2) using the same protocol.

The internet service search engine (205, FIG. 2) will then receive (step 315) responses from the internet services (210-1 to 210-3, FIG. 2). These responses may be transmitted to the internet service search engine (205, FIG. 2) through the mediation of the individual search engine client API modules (220-1 to 220-3, FIG. 2) installed in each of the internet services (210-1 to 210-3, FIG. 2). Each response may include the most recent data received from the second user (230, FIG. 2) by the internet service (210-1 to 210-3, FIG. 2) transmitting the response to the extent that the internet service (210-1 to 210-3, FIG. 2) is authorized by the second user (230, FIG. 2). These responses are received in real-time, and therefore reflect the most up-to-date information about the second user (230, FIG. 2) that may be obtained from the individual internet services (210-1 to 210-3, FIG. 2). In some examples, an interrogated internet service (210-1 to 210-3) which has no information about the second user (230, FIG. 2) to share in response to the query may provide a response to that effect, or may alternatively not respond to query by the internet service search engine (205, FIG. 2) at all.

After the responses have been received from the internet services (210-1 to 210-3), the internet service search engine (205, FIG. 2) may then synthesize the responses to extract or extrapolate information regarding a current or most recently known online location and/or activity of the second user (230, FIG. 2). For example, one or more of the responses may include information posted by the second user (230, FIG. 2) to an internet service (210-1 to 210-3, FIG. 2) together with time stamps indicating the time that information was posted. Thus, in certain embodiments, the internet service search engine (205, FIG. 2) may determine the current online location of the second user (230, FIG. 2) to be the internet service (210-1 to 210-3, FIG. 2) to which the second user (230, FIG. 2) has most recently posted information.

Additionally or alternatively, one or more responses transmitted to the internet service search engine (205, FIG. 2) may include an indication of whether the second user (230, FIG. 2) is currently logged in to the internet service (210-1 to 210-3, FIG. 2) sending the response. Thus, where a positive determination can be made that the second user (230, FIG. 2) is currently logged into a specific internet service (210-1 to 210-3, FIG. 2), the internet service search engine (205, FIG. 2) may determine that the current online location of the second user (230, FIG. 2) is the internet service (210-1 to 210-3, FIG. 2) to which the second user (230, FIG. 2) is currently logged in. In certain embodiments, the internet service search engine (205, FIG. 2) may determine that the second user (230, FIG. 2) is concurrently logged in to multiple internet services (210-1 to 210-3, FIG. 2). In such cases, the internet service search engine (205, FIG. 2) may take a hybrid approach to determining the online location of the second user (230, FIG. 2), by, for example, determining the online location of the second user (230, FIG. 2) to be the internet service (210-1 to 210-3, FIG. 2) where the second user (230, FIG. 2) is currently logged in and most active.

In certain situations, it is conceivable that the internet service search engine (205, FIG. 2) may receive insufficient or inconclusive responses from the internet services (210-1 to 210-3, FIG. 2). Under these circumstances, the internet service search engine (205, FIG. 2) may apply a predictive analysis incorporating records of past online presence patterns of the second user (230, FIG. 2) to guess the online presence of the second user (230, FIG. 2). The past online presence patterns may be obtained from responses to past searches for the second user (230, FIG. 2) and/or by "crawling" the internet services (210-1 to 210-3) periodically.

Once an online location of the second user (230, FIG. 2) has been determined, the internet service search engine then provides (step 320) a consolidated view of the responses received from the internet services (210-1 to 210-3, FIG. 2) to the first user. This consolidated view of the responses includes the determined online location of the second user (230, FIG. 2). Additionally, the consolidated view of the responses may include other relevant information in the responses, such as the current online activity of the second user (230, FIG. 2). For example, the consolidated view of the responses may include a file (e.g., photo, document, etc.) or other information (e.g., status update, comment, link, etc.) recently posted by the second user (230, FIG. 2) to social networks. The first user (225, FIG. 2) may then use the consolidated view of the responses to determine the best way to contact the second user (230, FIG. 2) and/or to view the most recent information posted by the second user (230, FIG. 2).

In certain embodiments, the internet service search engine (205, FIG. 2) will only search for and return results from a social networks established for the first user (225, FIG. 1) within each of the participating internet services (210-1 to 210-3, FIG. 2). For example, if the first user (225, FIG. 2) is searching for a second user (230, FIG. 2) named "John Doe," the internet service search engine (205, FIG. 2) will only receive a response from a participating internet service (210-1 to 210-3, FIG. 2) if a person named "John Doe" is a friend of the first user (225, FIG. 1) within that particular internet service (210-1 to 210-3, FIG. 2). In this way, the first user (225, FIG. 1) may only access information about the second user (230, FIG. 2) that the first user (225, FIG. 1) has already been authorized to view by the second user (230, FIG. 2). Alternatively, if the first user (225, FIG. 2) searches for a second user (230, FIG. 2) that does not share a social network with the first user (225, FIG. 2) in any of the internet services (210-1 to 210-3, FIG. 2), the internet services (210-1 to 210-3, FIG. 2) may respond to the internet service search engine (205, FIG. 2) with only information about the second user (230, FIG. 2) that the second user (230, FIG. 2) has authorized to be made public.

Figure 4:
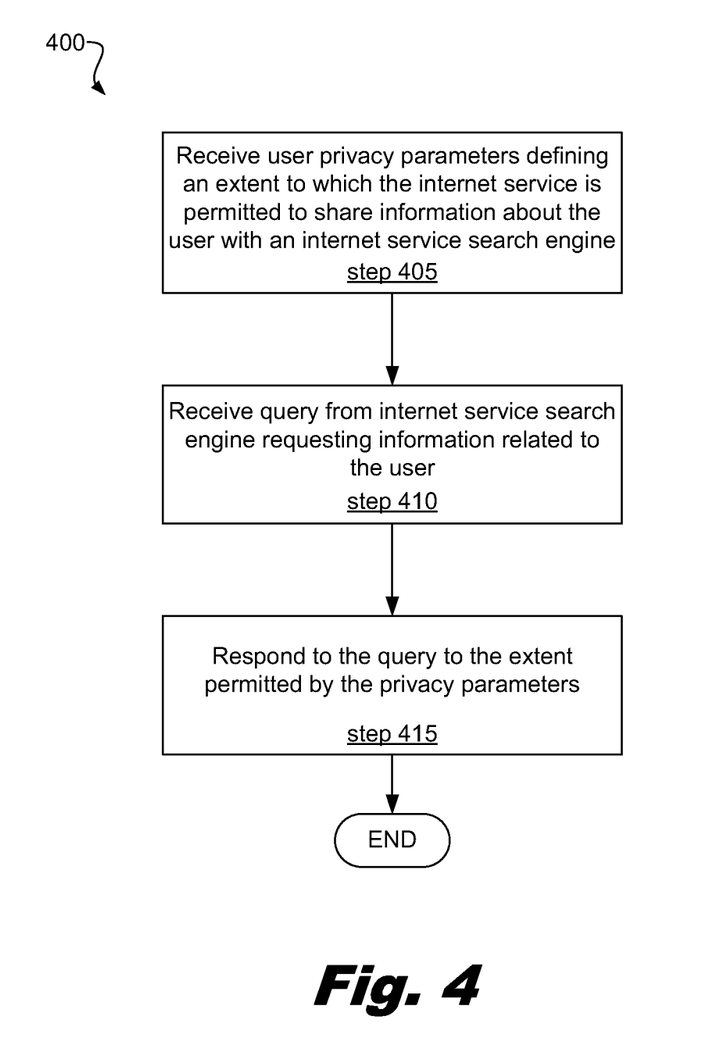
FIG. 4 is a flowchart diagram of an illustrative method of interacting with an internet service search engine in an internet service, according to one exemplary embodiment of principles described herein.

FIG. 4 shows an illustrative method (400) that may be implemented by a specific internet service (210-1 to 210-3, FIG. 2) for interacting with the internet service search engine (205, FIG. 2) while enforcing privacy parameters selected by the second user (230, FIG. 2). In this method (400), the internet service receives (step 405) user privacy parameters that enact a privacy policy defining the extent to which the internet service (210-1 to 210-3, FIG. 2) is permitted or authorized by the second user (230, FIG. 2) to share information about the user with an internet service search engine (205, FIG. 2). These privacy parameters may be an extension of or ancillary to privacy parameters already selected by the second user (230, FIG. 2) which govern the user's interaction with other users of the same internet service (210-1 to 210-3, FIG. 2).

Additionally or alternatively, these privacy parameters may be unique to the area of requests made by the internet service search engine (205, FIG. 2). For example, in embodiments where the internet service (210-1 to 210-3, FIG. 2) implements the search engine client API module (220-1 to 220-3, FIG. 2) affiliated with the internet service search engine (205, FIG. 2) described above, the search engine client API module (220-1 to 220-3, FIG. 2) (and by extension, the internet service search engine) may have access to the second user's data only to the extent the second user (230, FIG. 2) has explicitly authorized the search engine client API module (220-1 to 220-3, FIG. 2) to access his or her data.

Additionally or alternatively, the privacy parameters selected by the user may be dependent or contingent on the identity of the first user (225, FIG. 2) on whose behalf the internet service search engine (205, FIG. 1) is requesting information. For example, the second user (230, FIG. 2) may authorize the internet service (210-1 to 210-3, FIG. 2) to release information to the internet service search engine (205, FIG. 2) if the first user (225, FIG. 2) is a member of the social network of the second user (230, FIG. 2) within the internet service (210-1 to 210-3, FIG. 2). As such, in some embodiments the request made by the internet service search engine (205, FIG. 2) may include the identity of the first user (225, FIG. 2).

With the privacy parameters established, when a query is received (step 410) from the internet service search engine (205, FIG. 2) requesting information related to the second user (230, FIG. 2), the internet service (210-1 to 210-3, FIG. 2) will respond (step 415) to the query only to the extent permitted by the privacy parameters.

Figure 5:
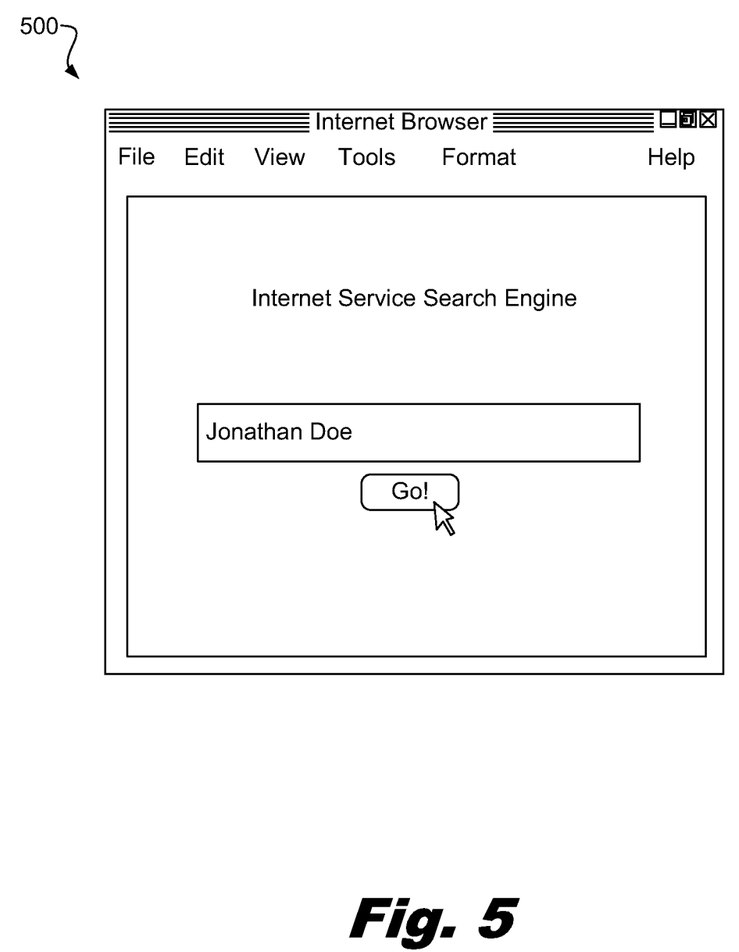
FIG. 5 is a diagram of an illustrative search window displayed to a user of an internet service search engine, according to one exemplary embodiment of principles described herein.
Figure 6:
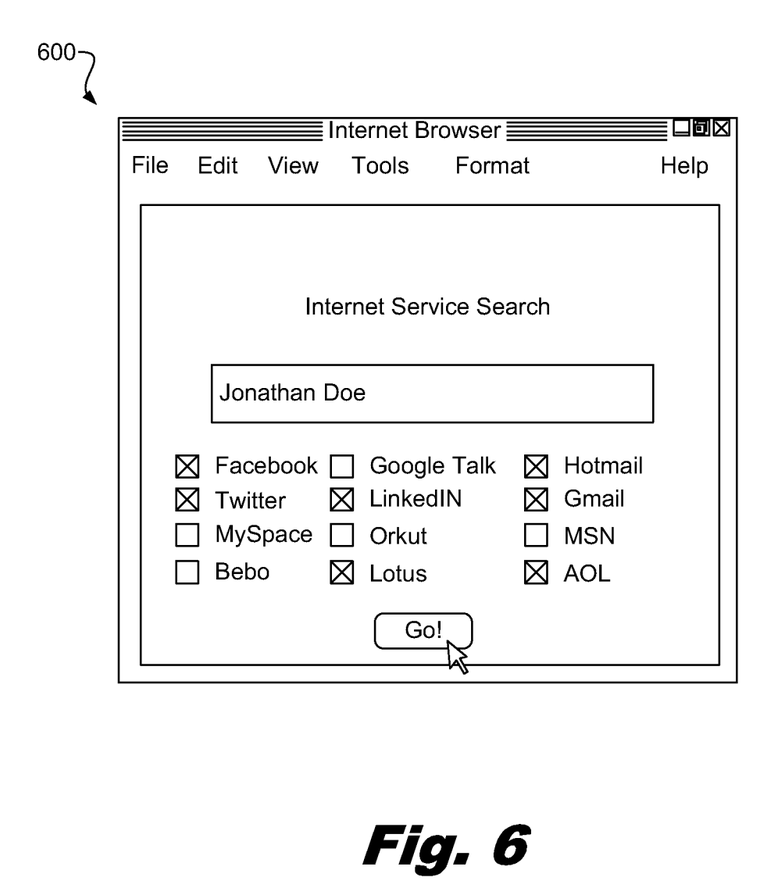
FIG. 6 is a diagram of an illustrative search window displayed to a user of an internet service search engine, according to one exemplary embodiment of principles described herein.
Figure 7:
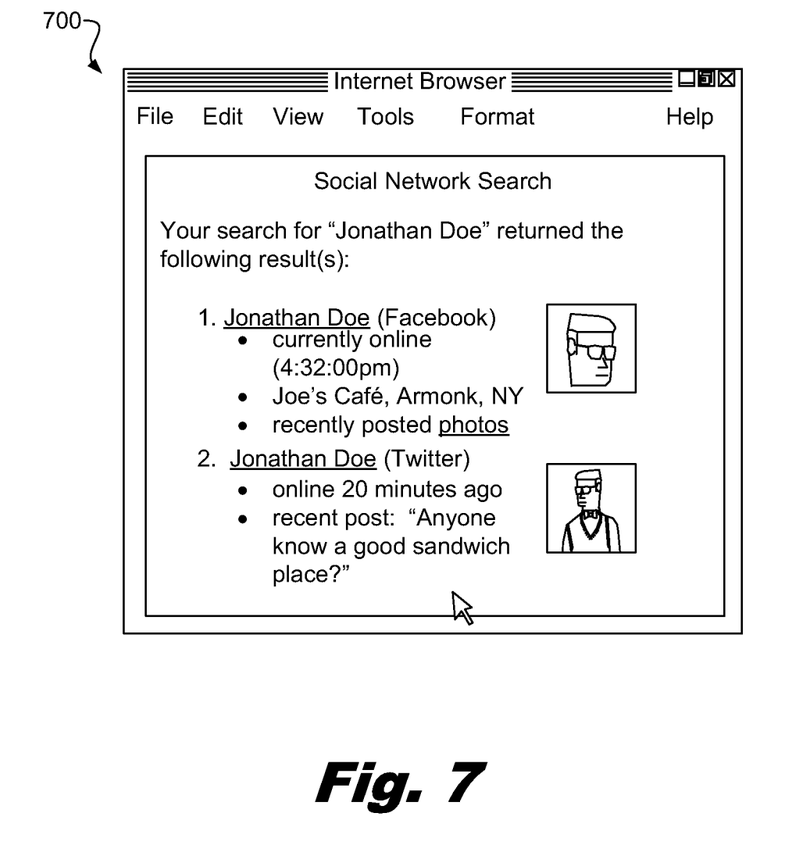
FIG. 7 is a diagram of an illustrative results window displayed to a user of an internet service search engine, according to one exemplary embodiment of principles described herein.

FIGS. 5-7 show illustrative windows (500, 600, 700, respectively) which may be displayed to the first user (225, FIG. 2) while interacting with the internet service search engine (205, FIG. 2).

FIG. 5 shows a simple search interface window (500) through which the first user (225, FIG. 2) may enter the name of the second user (230, FIG. 2) to initiate a search for the online location of the second user (230, FIG. 2).

FIG. 6 shows an illustrative search interface window (600) through which the first user (225, FIG. 2) has the additional option of selecting which internet services (210-1 to 210-3, FIG. 2) will be queried by the internet service search engine (205, FIG. 2).

FIG. 7 shows an illustrative results window (700) through which the first user (225, FIG. 2) may receive the consolidated view of the responses from the internet services (210-1 to 210-3, FIG. 2) interrogated by the internet service search engine (205, FIG. 2) in connection with the query. Consistent with the principles described herein, the consolidated view of responses shows that the online location of the second user (230, FIG. 2) in addition to a next most recent online location of the second user (230, FIG. 2) and a summary of the second party's activities at each online location.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A system for online location sharing through an internet service search engine, the system comprising:
    a server comprising at least one processor and a memory communicatively coupled to said processor, said memory comprising instructions stored thereon that, when executed by said at least one processor, cause said at least one processor to:
    receive from a first user a query identifying a second user;
    query a plurality of internet services, each of said plurality of internet services storing information about said second user, over a network for real-time information relevant to said second user; and
    provide a number of responses received from said plurality of internet services to said first user, said server being authorized by said second user to receive all information relevant to said second user contained in said responses; wherein a number of said responses indicate which of said plurality of said internet services is an online location of said second user.

2. The system of claim 1, wherein each said response comprises information relevant to said second user only to an extent permitted by a privacy policy set by said second user.

3. The system of claim 1, wherein said online location of said second user is one of said plurality of said internet services that was most recently used by said second user.

4. The system of claim 1, wherein said online location of said second user one of said plurality of said internet services to which said second user is currently logged in.

5. The system of claim 1, wherein said processor determines said online location of said second user from said plurality of responses by:
    identifying a most recent time stamp associated with information posted by said second user to said plurality of internet services, said information and said time stamp being present in said responses received from said plurality of internet services; and determining said online location to be said one of said plurality of said internet services to which said second user posted said information associated with said most recent time stamp.

6. The system of claim 1, wherein said responses comprise a current online activity of said second user.

7. A computer program product for online location sharing through an internet service search engine, the computer program product comprising:

a computer readable storage medium having computer readable program code embodied therewith, the computer readable program code comprising:

computer readable program code configured to receive from a first user a query identifying a second user;

computer readable program code configured to query a plurality of internet services, each of which store information about said second user, over a network for real-time information relevant to said second user; and computer readable program code configured to provide a number of responses received from said plurality of internet services to said first user, said first user being authorized by said second user to receive all information relevant to said second user contained in said responses; wherein a number of said responses indicate which of said plurality of said internet services is an online location of said second user.

8. The computer program product of claim 7, further comprising computer readable program code configured to determine a way to contact said second user through one of said internet services.

9. The computer program product of claim 7, wherein at least one of said plurality of internet services is a social network.

10. The computer program product of claim 7, further comprising computer readable program code configured to view information recently posted by said second user through one of said plurality of internet services.

11. The computer program product of claim 7, further comprising computer readable program code configured to apply a predictive analysis incorporating records of past online presence patterns of said second user from said responses received from said plurality of internet services to guess said online location of the second user.

12. The computer program product of claim 7, further comprising computer readable program code configured to establish communication between an internet service search engine and an individual search engine client application programming interface modules installed in each of said plurality of internet services.

13. The method of claim 1, further comprising applying a predictive analysis incorporating records of past online presence patterns of said second user from said responses received from said plurality of internet services to guess said online location of the second user.

14. The computer program product of claim 7, wherein said responses comprise a summary of online activity of said second user.

15. The system of claim 6, wherein said current online activity of said second user is posting information to a social network.

16. The computer program product of claim 7, wherein said responses comprise a summary of online activity of said second user.

17. The system of claim 1, wherein said at least one processor is programmed to determine a way to contact said second user through one of said internet services.

18. The system of claim 1, wherein at least one of said plurality of internet services is a social network.

19. The system of claim 1, wherein said at least one processor is programmed to view information recently posted by said second user through one of said plurality of said internet services.

20. A system for online location sharing through an internet service search engine, the system comprising:

a server comprising at least one processor and a memory communicatively coupled to said processor, said memory comprising instructions stored thereon that, when executed by said at least one processor, cause said at least one processor to:

receive from a first user a query identifying a second user;

query a plurality of internet services, each of which store information about said second user, over a network for real-time information relevant to online activity of said second user, where at least one of said plurality of internet services is a social network; and provide a number of responses received from said plurality of internet services to said first user, said server being authorized by said second user to receive all information relevant to said online activity of said second user contained in said responses; wherein a number of said responses indicate which of said plurality of said internet services is an online location of said second user.

21. The system of claim 20, wherein said processor is further programmed to determine to contact said second user through said at least one social network.

* * * * *